United States Patent Office 3,825,589
Patented July 23, 1974

3,825,589
PRODUCTION OF 2-BUTYL-N,N'-DIPHENYL-MALONOMONOHYDRAZIDE
Kurt Klemm, Allensbach, and Erhard Langenscheid, Constance, Germany, assignors to BYK-Gulden Lomberg Chemische Fabrik GmbH, Constance, Germany
No Drawing. Filed Nov. 1, 1971, Ser. No. 194,536
Int. Cl. C07c 103/34
U.S. Cl. 260—518 R          19 Claims

ABSTRACT OF THE DISCLOSURE

Phenylbutazone is hydrolyzed in admixture with 1 to 10 equivalents of a water-soluble alkali metal salt and 10 to 100 moles of water per mole of phenylbutazone. Resulting 2 - butyl-N,N'-diphenylmalonomonohydrazide is then separated from the hydrolysis product.

BACKGROUND

German Patent specification 1,235,936 points out that malonic acid monohydrazides have an antiphlogistic and antipyretic activity in combination with relatively low toxicity; moreover, they are suitable for the treatment of rheumatic and other inflammatory ailments, for example for prophylaxis and for treating thrombophlebitis.

German Patent specification 1,235,936 indicates that 2-butyl - N,N-diphenylmalonomonohydrazide can be produced by (a) heating 1,2 - diphenyl-4-n-butyl-3,5-dioxopyrazolidine (i.e. phenylbutazone) with a substantially equivalent quantity of an inorganic base, such as alkali metal hydroxide in an aqueous medium, (b) filtering the hydrazobenzene (N,N'-diphenylhydrazine) formed, (c) extracting the filtrate at pH ≦ 3 (acid to Congo red) with ethyl acetate, (d) extracting the ethyl acetate extract with 0.5 N potassium hydrogen carbonate solution, (e) extracting the thus obtained extracts at pH ≦ 3 (acid to Congo red) with ethyl acetate and (f) then isolating in a conventional manner 2-butyl-N,N'-diphenylmalonomonohydrazide from the latter ethyl acetate extracts.

The yield is moderate and only amounts to 51.5%.

SUMMARY 2-butyl-N,N'-diphenylmalonomonohydrazide or its calcium, magnesium or aluminum salt is prepared by hydrolyzing under reflux 1,2-diphenyl-4-n-butyl-3,5-dioxopyrazolidine in admixture with (a) a substantially equivalent quantity of alkali metal hydroxide, preferably sodium hydroxide, (b) a water soluble alkali metal salt of an inorganic or organic acid and (c) from 10 to 100 moles of water per mole of 1,2-diphenyl-4-n-butyl-3,5-dioxopyrazolidine. 2 - butyl-N,N'-diphenylmalonomonohydrazide is thereafter separated from the resulting reaction mixture by one of several alternative procedures, e.g.:

(a) 1,2-diphenyl-4-n-butyl-3,5-dioxopyrazolidine still present in the reaction mixture is extracted in a neutral to weakly alkaline medium, preferably at a pH value between 7 and 7.5, with an organic solvent immiscible with water, and 2-butyl-N,N'-diphenylmalonomonohydrazide is released by acidifying the aqueous alkali metal salt solution; alternatively, the alkali metal salt solution is reacted with a water-soluble calcium, magnesium or aluminum salt, (b) alkali metal salt of 2 - butyl-N,N'-diphenylmalonomonohydrazide (possibly after adding more alkali metal salt of an inorganic or organic acid) in the resulting reaction mixture is crystallized out; the crystallized alkali metal salt of 2-butyl-N,N'-diphenylmalonomonohydrazide is separated and dissolved in water; the thus obtained solution is adjusted to from neutral to weakly alkaline, preferably having a pH value between 7 and 7.5; remaining 1,2-diphenyl-4-n-butyl-3,5-dioxopyrazolidine is extracted with an organic solvent which is not miscible with water; and the alkali metal salt of 2-butyl-N,N'-diphenylmalonomonohydrazide is converted by acidifying into 2-butyl-N,N'-diphenylmalonomonohydrazide or, if desired, is reacted with water-soluble calcium, magnesium or aluminum salts, (c) alkali metal salt of 2 - butyl-N,N'-diphenylmalonomonohydrazide in the resulting reaction mixture is extracted (possibly after adding more alkali metal salt of an inorganic or organic acid) in neutral to weakly alkaline medium, preferably at a pH value between 7 and 7.5, with an organic solvent not miscible with water; the alkali metal salt of 2-butyl-N,N'-diphenylmalonomonohydrazide is selectively extracted from the organic phase with water; and the extracted alkali metal salt of 2-butyl-N,N'-diphenylmalonomonohydrazide is converted by acidifying into 2-butyl-N,N'-diphenylmalonomonohydrazide or, if desired, is reacted with water-soluble calcium, magnesium or aluminum salts.

DETAILS

Hydrolysis of phenylbutazone in admixture with water-soluble alkali metal salt in aqueous medium is essential to and characteristic of the invention herein disclosed.

The alkali metal of the water-soluble alkali metal salt is not critical; it can be any alkali metal, e.g. sodium, potassium and lithium. Of these, sodium is preferred. The salt can be either an organic or an inorganic salt; the only limitation is that it be water-soluble. For convenience, the water-soluble alkali metal salt is preferably a readily accessible salt of a simple acid. Illustrative of these are sodium chloride, sodium acetate, disodium hydrogen phosphate, monosodium hydrogen phosphate, sodium borate, sodium bromide, sodium formate, sodium iodide, sodium sulfate, sodium sulfite, potassium chloride, potassium sulfate, potassium acetate, lithium chloride and lithium sulfate; of these sodium chloride is particularly preferred.

The amount of water-soluble alkali metal salt in the reaction medium, e.g., at the time the hydrolysis is initiated corresponds to form about 1 to about 10 (advantageously from about 2 to about 5 and preferably from 3 to 4) gram equivalents of alkali metal per gram equivalent of starting phenylbutazone.

The relative amount of water in the reaction medium is also a controlling factor. Such medium includes from about 10 to about 100, preferably from about 40 to about 80, moles of water per mole of initial phenylbutazone.

For separating the obtained 2-butyl-N,N'-diphenylmalonomonohydrazide from the hydrolysis reaction product, the employed organic solvent is virtually any water-immiscible organic solvent. Halogenated hydrocarbons, e.g. chloroform, dichloromethane, 1,2-dichloroethane, trichloroethylene and chlorobenzene and aromatic hydrocarbons, e.g. toluene, xylene and benzene, are preferred, but other water-immiscible organic solvents, such as ethers, e.g. diethylether, and esters, e.g. ethyl acetate, are similarly useful for the indicated purpose.

The sole limitation with regard to the employed calcium, magnesium or aluminum salts is that they be water-soluble. Illustrative of these are calcium chloride, magnesium sulfate and aluminum chloride.

Whenever reference is made to (a) water-soluble alkali metal salt, (b) water-immiscible organic solvents or (c) calcium, magnesium or aluminum salt, it includes a single compound or any combination of compounds within the indicated category.

The subject hydrolysis of phenylbutazone is preferably carried out in a protective gas atmosphere, more particularly in an inert atmosphere, such as a nitrogen atmosphere. Hydrolysis is preferably continued for from 5 to 30 and, more particularly, from about 10 to about 15 hours.

A particularly preferred embodiment of the subject method is as follows:

Under reflux a mixture of phenylbutazone, sodium hydroxide, sodium chloride and water in an approximate molar ratio of 1:1:3:(60 to 75) is hydrolyzed in a nitrogen atmosphere for from 10 to 15 hours, and the reaction mixture (after cooling with water) is diluted to 2 to 4 times its volume. The thus-diluted reaction mixture is extracted (at a pH value of between 7 and 7.5) with a water-immiscible organic solvent, preferably a halogenated hydrocarbon, such as chloroform, or an aromatic hydrocarbon, such as toluene. In view of the salt content of the solution (diluted hydrolysis product) the sodium salt of 2-butyl-N,N'-diphenylmalonomonohydrazide (present in the reaction mixture), unreacted phenylbutazone and byproducts of the hydrolysis, such as caproic-acid-N,N'-diphenylhydrazide, are transferred practically quantitatively into the organic phase and are separated from the salt solution. By extracting the organic phase with water, the sodium salt of 2-butyl-N,N'-diphenylmalonomonohydrazide is selectively and practically quantitatively extracted from the organic phase, and all impurities (including the still unreacted phenylbutazone) remain in the organic phase.

By acidifying solutions of the sodium salt of 2-butyl-N,N'-malonomonohydrazide obtained in this manner or by double decomposition with water-soluble calcium, magnesium or aluminum salts, 2-butyl-N,N'-diphenyl-malonomonohydrazide is obtained in the form of the free acid or in the form of its sparingly soluble calcium, magnesium or aluminum salts with a degree of purity of more than 99.5%.

By extraction of the organic phase with, preferably, 1 to 2 normal (N) sodium hydroxide solution, unreacted phenylbutazone is selectively extracted from the organic phase containing the impurities and is recovered in a pure form by acidifying in a conventional manner.

Surprisingly, the addition of a water-soluble alkali metal salt of an inorganic or organic acid brings about such an increase in the speed of hydrolysis of phenylbutazone to 2-butyl-N,N'-diphenylmalonomonohydrazide that the reaction time is substantially reduced. Thus, when 3 moles of sodium chloride are used per mole of phenylbutazone, after reacting for only 10 hours, an overall yield of 82.2% of 2-butyl-N,N'-diphenylmalonomonohydrazide is obtained. The addition of the metal salt insures that, in contrast to the method described in example 1 of German specification 1,235,936, practically no hydrazobenzene is produced.

After hydrolysis of phenylbutazone with equivalent quantities of sodium hydroxide at approximately 100° C. (under reflux) in the presence of various quantities of sodium chloride and 68.5 moles of water per mole of phenylbutazone, caproic-acid - N,N'-diphenylhydrazide, phenylbutazone, hydrazobenzene and 2-butyl-N,N'-diphenyl-malonomonohydrazide are present in the obtained reaction mixture in the quantities given in table I, are results from the quantitative isolation of the four compounds.

TABLE I

| Reaction time in hours | Moles NaCl per mole phenylbutazone used | Caproic-acid-N,N'-diphenyl-hydrazide | 1,2-diphenyl-4-n-butyl-3,5-dioxo-pyrazolidine | Hydrazobenzene | 2-butyl-N,N'-diphenyl-malonomonohydrazide |
|---|---|---|---|---|---|
| 30 | | 5.1 | 20.0 | 5.5 | 69.4 |
| | 1 | 9.0 | 8.7 | 1.4 | 79.9 |
| | 2 | 12.6 | 7.1 | 1.3 | 79.0 |
| | 3 | 19.3 | 5.9 | 1.2 | 73.6 |
| 20 | | 3.4 | 73.5 | 0.7 | 58.4 |
| | 1 | 5.1 | 20.8 | 1.1 | 73.0 |
| | 2 | 5.0 | 14.2 | 0.3 | 80.5 |
| | 3 | 8.1 | 10.5 | 0.8 | 80.6 |
| 10 | | 1.0 | 46.3 | 0 | 52.7 |
| | 2 | 2.1 | 30.2 | 0 | 67.7 |
| | 3 | 3.1 | 14.0 | 0.7 | 82.2 |
| | 4 | 5.3 | 12.1 | 0 | 82.6 |
| | 5 | 7.9 | 9.1 | 0.7 | 82.3 |

2-butyl-N,N'-diphenylmalonomonohydrazide (in free acid form and in the form of a pharmaceutically acceptable salt, e.g. the calcium salt) is useful for mammals as an anti-inflammatory and/or for reducing fever in the treatment of, e.g., rheumatic fever and thrombophlebitis [compare French medical Patent No. 7565M]. It is administered either orally or parenterally in standard dosage forms prepared according to conventional techniques. Such dosage forms for oral administration include tablets and capsules, wherein the pharmaceutical compositions may contain one or more conventional adjuvants, such as sweetening agents, flavoring agents, coloring agents and preserving agents, in addition to conventional pharmaceutical excipients, e.g. inert diluents, such as calcium carbonate, sodium carbonate, lactose and talc; granulating and disintegrating agents, such as starch and alginic acid; binding agents, such as starch, gelatin and acacia; and lubricating agents, such as magnesium stearate, stearic acid and talc.

Each of the alkali metal salts, the calcium salt, the magnesium salt and the aluminum salt of 2-butyl-N,N'-diphenylmalonomonohydrazide is convertible into the corresponding free acid or a corresponding pharmaceutically acceptable salt by well-known and conventional techniques.

The invention is readily understood from the preceding description and the following specific examples, which are merely illustrative of preferred embodiments and in no way limitative. Various changes can be made in the process without departing from the spirit and scope of the invention or sacrificing its material advantages.

Example 1

50 grams (g.) [0.162 mole] of 1,2-diphenyl-4-n-butyl-3,5-dioxopyrazolidine, 6.48 g. [0.162 mole] of sodium hydroxide, 14.2 g. [0.080 mole; approximately 1 gram equivalent (val.) of Na per mole of phenylbutazone] of disodium hydrogenphosphate. 2H₂O and 200 milliliters (ml.) [11.1 moles] of water are refluxed under nitrogen for 30 hours. The obtained mixture is then cooled to room temperature (20° C.), diluted with 300 ml. of water and filtered under vacuum from precipitated caproic-acid-N,N'-diphenylhydrazide. The filtrate is neutralized with 2N HCl and extracted at pH 7 to 7.5 three to four times with 50 ml. portions of chloroform. The aqueous phase is acidified with 2N HCl down to pH 2, extracted with CHCl₃ and, after drying with soda and MgSO₄, the chloroform phase is concentrated under vacuum. The yield is 42.6 g. (80.6%) of 2-butyl-N,N'-diphenylmalonomonohydrazide in the form of a colorless oil, which crystallizes after nucleation.

Examples 2

50 g. [0.162 mole] of 1,2-diphenyl-4-n-butyl-3,5-dioxopyrazolidine, 6.48 g. [0.162 mole] of sodium hydroxide, 13.3 g. [0.162 mole] of sodium acetate and 200 ml. [11.1 mole] of water are refluxed under a nitrogen atmosphere for 30 hours. The mixture is cooled to 20° and vacuum filtered from crystallized caproic-acid-N,N'-diphenylhydrazide.

The filtrate is left overnight in a refrigerator (about 3° to 4° C.) after addition thereto of 20 g. of sodium chloride. The sodium salt of 2-butyl-N,N'-diphenylmalonomonohydrazide crystallized out, is separated by vacuum filtration and dissolved in 400 ml. water. Neutralization is carried out with a little 2N HCl, and the impurities are extracted at pH 7 to 7.5 with chloroform.

After acidification of the aqueous phase with 2N HCl down to pH 2 and extraction with chloroform, de-acidification and drying out of the organic phase with soda and MgSO$_4$, respectively, and distilling off the chloroform in vacuo, 40.4 g. (76.5%) of 2-butyl - N,N' - diphenylmalonomonohydrazide are obtained as a light yellow oil, which soon completely solidifies.

Example 3

50 g. [0.162 mole] of 1,2-diphenyl-4-n-butyl-3,5-dioxopyrazolidine, 6.48 g. [0.162 mole] of sodium hydroxide and 18.9 g. [0.323 mole] of sodium chloride are heated for 20 hours with 200 ml. [11.1 moles] of water in a nitrogen atmosphere under reflux.

The mixture is cooled, diluted with 400 ml. of water and vacuum filtered from precipitated caprocic-acid-N,N'-diphenylhydrazide. The filtrate is neutralized with 2N HCl down to pH 7 to 7.5. Then the sodium salt of 2-butyl-N,N'-diphenylmalonomonohydrazide is crystallized out and is separated by vacuum filtration. The sodium salt of 2-butyl - N,N' - diphenylmalonomonohydrazide is then dissolved in 300 ml. of water; filtration is carried out, and a solution of 8 g. of calcium chloride in 50 ml. of water is added to the filtrate at 40° C. The precipitate is stirred for one hour at 40° C. and is then filtered.

45.1 g. (80.5%) of the calcium salt of 2-butyl-N,N'-dipheylmalonomonohydrazide are obtained.

Example 4

50 g. [0.162 mole] of 1,2-diphenyl-4-n-butyl-3,5-dioxopyrazolidine, 6.48 g. [0.162 mole] of sodium hydroxide and 28.35 g. [0.485 mole] of sodium chloride are heated for 10 hours with 200 ml. [11.1 moles] of water in a nitrogen atmosphere under reflux. After cooling, dilution is carried out with 400 ml. of water, and the resulting solution is neutralized with 2N HCl to pH to 7.5. Extraction of the neutralized solution is carried out with three 100 ml. portions of chloroform; following this, the bulked chloroform phases are extracted with three 100 ml. portions of water. The bulked water phases are then shaken up once with a 50 ml. portion of chloroform; after separation of the chloroform the solvent residues are removed by distillation for a short time in vacuo. After the addition of a solution of 8 g. of calcium chloride in 50 ml. of water at 40° C. and stirring for one hour, the precipitated calcium salt is filtered, washed and dried in vacuo. 46 g. (82.2%) of the calcium salt of 2-butyl-N,N'-diphenylmalonomonohydrazide are thus obtained.

The chloroform phase is extracted with three 50 ml. portions of 2N NaOH. On acidification of the aqueous phase 7.0 g. (14%) 1,2-diphenyl-4-n-butyl - 3,5 - dioxopyrazolidine are obtained.

If the sodium chloride mentioned in example 4 is replaced by other salts, the yields of 2-butyl-N,N'-diphenylmalonomonohydrazide indicated in table II are obtained in the form of the calcium salt (or in the forms of magnesium or aluminum salt when corresponding quantities of magnesium sulfate or aluminum chloride are added instead of calcium chloride).

TABLE II

| Salt | Quantity, g. | Molar ratio, salt: phenylbutazone | Reaction time, hours (under reflux) | Yield of 2-butyl-N,N'-diphenylmalonomonohydrazide (percent in the form of the — | | |
|---|---|---|---|---|---|---|
| | | | | Ca-salt | Mg-salt | Al-salt |
| NaCl | 28.35 | 3:1 | 10 | 82.2 | 75.8 | 76.6 |
| KCl | 48.4 | 4:1 | 10 | 79.8 | 73.6 | 74.3 |
| CH$_3$COONa | 53.2 | 4:1 | 10 | 72.4 | 66.8 | 67.4 |
| Na$_2$HPO$_4 \cdot$2H$_2$O | 57.6 | 2:1 | 10 | 80.2 | 74.0 | 74.6 |
| Na$_2$SO$_4$ | 46.0 | 2:1 | 10 | 77.3 | 71.3 | 72.0 |

Example 5

If operations are carried out in accordance with example 4 but 100 ml. [5.55 moles] of water are used instead of 200 ml. of water, 42.2 g. (75.3%) of the calcium salt of 2-butyl-N,N'-diphenylmalonomonohydrazide are obtained.

What is claimed is:

1. In a process for hydrolyzing phenylbutazone in a reaction mixture under reflux conditions to produce 2-butyl-N,N'-diphenylmalonomonohydrazide, the improvement wherein the reaction mixture contains from 10 to 100 moles of water and from 1 to 10 gram equivalents of alkali metal in the form of a water-soluble alkali metal salt per mole of phenylbutazone.

2. A process according to claim 1 which comprises hydrolyzing phenylbutazone to 2-butyl-N,N'-diphenylmalonomonohydrazide and separating the latter from the obtained hydrolysis product.

3. A process according to claim 2 wherein separating the 2 - butyl-N,N'-diphenylmalonomonohydrazide comprises:
   (a) adjusting the pH of the obtained hydrolysis product to neutral or a weakly alkaline pH;
   (b) extracting unreacted phenylbutazone from the thus-obtained neutral to weakly alkaline medium with a water-immiscible organic solvent; and
   (c) releasing 2 - butyl-N,N'-diphenylmalonomonohydrazide retained in the aqueous neutral to weakly alkaline medium by acidifying the latter.

4. A process according to claim 2 wherein separating the 2 - butyl-N,N'-diphenylmalonomonohydrazide comprises:
   (a) adjusting the pH of the obtained hydrolysis product to neutral or a weakly alkaline pH;
   (b) extracting unreacted phenylbutazone from the thus-obtained neutral to weakly alkaline medium with a water-immiscible organic solvent; and
   (c) reacting alkali metal salt of 2-butyl-N,N'-diphenylmalonomonohydrazide retained in the aqueous neutral to weakly alkaline medium with a water-soluble salt of a metal selected from the group consisting of calcium, magnesium and aluminum.

5. A process according to claim 2 wherein separating the 2 - butyl-N,N'-diphenylmalonomonohydrazide comprises:
   (a) crystallizing alkali metal salt of 2-butyl-N,N'-diphenylmalonomonohydrazide from the obtained hydrolysis product;
   (b) separating the resulting crystallized alkali metal salt;
   (c) dissolving the separated crystallized alkali metal salt in water;

(d) extracting unreacted phenylbutazone with water-immiscible organic solvent from the resulting solution at a neutral to weakly alkaline pH; and
(e) acidifying the thus-extracted aqueous phase.

6. A process according to claim 2 wherein separating the 2 - butyl-N,N'-diphenylmalonomonohydrazide comprises:
   (a) crystallizing alkali metal salt of 2-butyl-N,N'-diphenylmalonomonohydrazide from the obtained hydrolysis product;
   (b) separating the resulting crystallized alkali metal salt;
   (c) dissolving the separated crystallized alkali metal salt in water;
   (d) extracting unreacted phenylbutazone with water-immiscible organic solvent from the resulting solution at a neutral to weakly alkaline pH; and
   (e) reacting alkali metal salt of 2-butyl-N,N'-diphenylmalonomonohydrazide in the thus-extracted aqueous phase with a water-soluble salt of a metal selected from the group consisting of calcium, magnesium and aluminum.

7. A process according to claim 2 wherein separating the 2 - butyl-N,N'-diphenylmalonomonohydrazide comprises:
   (a) extracting alkali metal salt of 2-butyl-N-N'-diphenylmalonomonohydrazide at neutral to weakly alkaline pH with an organic water-immiscible solvent from the obtained hydrolysis product;
   (b) selectively extracting the alkali metal salt of 2-butyl-N,N'-diphenylmalonomonohydrazide from the thus-obtained organic phase with water; and
   (c) acidifying the thus-obtained water extract.

8. A process according to claim 2 wherein separating the 2 - butyl-N,N'-diphenylmalonomonohydrazide comprises:
   (a) extracting alkali metal salt of 2-butyl-N-N'-diphenylmalonomonohydrazide at neutral to weakly alkaline pH with an organic water-immiscible solvent from the obtained hydrolysis product;
   (b) selectively extracting the alkali metal salt of 2-butyl-N,N'-diphenylmalonomonohydrazide from the thus-obtained organic phase with water; and
   (c) reacting said alkali metal salt in the water extract with a water-soluble salt of a metal selected from the group consisting of calcium, magnesium and aluminum.

9. A process according to claim 1 wherein the alkali metal salt is a salt selected from the group consisting of sodium chloride, sodium acetate, disodium hydrogen phosphate, monosodium hydrogen phosphate, sodium borate, sodium bromide, sodium formate, sodium iodide, sodium sulfate, sodium sulfite, potassium chloride, potassium sulfate, potassium acetate, lithium chloride and lithium sulfate.

10. A process according to claim 2 which comprises extracting at neutral to weakly alkaline pH and wherein such pH is from 7 to 7.5.

11. A process according to claim 2 which comprises extracting with a water-immiscible solvent.

12. A process according to claim 11 wherein the water-immiscible solvent is a member selected from the group consisting of halogenated hydrocarbon and aromatic hydrocarbon.

13. A process according to claim 12 wherein the solvent is at least one halogenated hydrocarbon selected from the group consisting of chloroform, dichloromethane, 1,2-dichloroethane, trichloroethylene and chlorobenzene.

14. A process according to claim 12 wherein the solvent is at least one aromatic hydrocarbon selected from the group consisting of toluene, xylene and benzene.

15. A process according to claim 2 wherein separating comprises reacting alkali metal salt of 2-butyl-N,N'-diphenylmalonomonohydrazide in an aqueous medium with a water-soluble salt and wherein the water-soluble salt is a salt selected from the group consisting of calcium chloride, magnesium sulfate and aluminum chloride.

16. A process according to claim 1 wherein hydrolysis is effected in an inert protective gas atmosphere.

17. A process according to claim 16 wherein the atmosphere is a nitrogen atmosphere.

18. A process according to claim 1 wherein hydrolyzing is effected for a period of from 5 to 30 hours.

19. A process according to claim 18 wherein hydrolyzing is effected for a period of from 10 to 15 hours.

References Cited

UNITED STATES PATENTS 3,455,999   7/1969   Pfister et al. _____ 260—518 R

LORRAINE A. WEINBERGER, Primary Examiner

L. A. THAXTON, Assistant Examiner

U.S. Cl. X.R.

260—448 R

UNITED STATES PATENT OFFICE
CERTIFICATE OF CORRECTION

Patent No. 3,825,589        Dated July 23, 1974

Inventor(s)    KURT KLEMM ET AL

It is certified that error appears in the above-identified patent and that said Letters Patent are hereby corrected as shown below:

Column 1, below line 7, insert "Claim of Priority, application Germany, November 13, 1970, P 20 55 845.6.".

Column 4, line 3, "are" should read --as--; line 17 (4th column of table), "73.5" should read --37.5--.

Signed and sealed this 19th day of November 1974.

(SEAL)
Attest:

McCOY M. GIBSON JR.            C. MARSHALL DANN
Attesting Officer              Commissioner of Patents